(12) United States Patent
Krishnaswami et al.

(10) Patent No.: US 8,560,193 B2
(45) Date of Patent: Oct. 15, 2013

(54) RANGE SHIFTING OF AN AUTOMATIC TRANSMISSION

(75) Inventors: Ram Krishnaswami, Farmington, MI (US); Matthew L. Fyie, Canton, MI (US); Todd C. Spaulding, Ann Arbor, MI (US); William R. Goodwin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 884 days.

(21) Appl. No.: 12/723,749

(22) Filed: Mar. 15, 2010

(65) Prior Publication Data

US 2011/0219905 A1    Sep. 15, 2011

(51) Int. Cl.
*G06F 7/00* (2006.01)

(52) U.S. Cl.
USPC ............................ 701/62; 701/51; 74/473.12

(58) Field of Classification Search
None
See application file for complete search history.

(56) References Cited

U.S. PATENT DOCUMENTS

| | | | | |
|---|---|---|---|---|
| 2,610,518 A * | 9/1952 | Goedeke et al. | | 74/365 |
| 3,791,233 A * | 2/1974 | Bane | | 74/492 |
| 4,745,822 A * | 5/1988 | Trachman et al. | | 74/335 |
| 4,790,204 A | 12/1988 | Tury et al. | | |
| 4,843,901 A * | 7/1989 | Peterson et al. | | 74/335 |
| 4,912,997 A | 4/1990 | Malcolm et al. | | |
| 5,085,106 A * | 2/1992 | Bubnash | | 74/335 |
| 5,117,710 A | 6/1992 | Asano et al. | | |
| 5,180,959 A * | 1/1993 | Christopher | | 318/626 |
| 5,377,554 A * | 1/1995 | Reulein et al. | | 74/2 |
| 5,664,539 A * | 9/1997 | Vieira | | 123/198 DB |
| 5,744,876 A * | 4/1998 | Fangio | | 307/66 |
| 5,827,149 A * | 10/1998 | Sponable | | 477/92 |
| 5,886,603 A * | 3/1999 | Powell | | 335/164 |
| 6,016,717 A | 1/2000 | Wheeler | | |
| 6,056,669 A * | 5/2000 | Marshall | | 74/335 |
| 6,139,468 A * | 10/2000 | Goates et al. | | 477/97 |
| 6,196,078 B1 * | 3/2001 | DeJonge et al. | | 74/473.12 |
| 6,230,576 B1 | 5/2001 | Yamada et al. | | |
| 6,487,484 B1 * | 11/2002 | Shober et al. | | 701/51 |
| 6,752,036 B2 | 6/2004 | Kropp et al. | | |
| 7,156,218 B2 * | 1/2007 | Yamamoto | | 192/219.4 |
| 7,243,567 B2 | 7/2007 | Osamura et al. | | |
| 7,313,980 B2 | 1/2008 | Otsuka et al. | | |
| 7,349,770 B2 * | 3/2008 | Matsuzaki et al. | | 701/1 |
| 7,370,547 B2 | 5/2008 | Amamiya et al. | | |
| 7,472,627 B2 * | 1/2009 | Skelton et al. | | 74/586 |
| 7,966,903 B2 * | 6/2011 | Kimura et al. | | 74/335 |
| 2002/0045506 A1 | 4/2002 | Scheuerer | | |
| 2005/0044979 A1 * | 3/2005 | Fort et al. | | 74/473.21 |
| 2007/0176448 A1 | 8/2007 | Spykerman et al. | | |
| 2007/0284213 A1 | 12/2007 | Duhaime et al. | | |
| 2008/0173121 A1 * | 7/2008 | Kimura et al. | | 74/473.12 |
| 2008/0302628 A1 * | 12/2008 | Kimura et al. | | 192/220 |
| 2009/0024286 A1 * | 1/2009 | Gierling et al. | | 701/51 |
| 2009/0062064 A1 | 3/2009 | Kamada et al. | | |
| 2009/0287383 A1 * | 11/2009 | Fujii et al. | | 701/51 |
| 2011/0087386 A1 * | 4/2011 | Steinhauser et al. | | 701/2 |

* cited by examiner

*Primary Examiner* — Thomas Black
*Assistant Examiner* — Donald J Wallace
(74) *Attorney, Agent, or Firm* — James Dottavio; MacMillan, Sobanski & Todd, LLC

(57) ABSTRACT

A system for shifting a transmission range includes a selector producing a signal representing a selected range, and the system has a primary state wherein a source of electric power shifts the transmission to the selected range in response to the signal, and a secondary state wherein a source of mechanical energy shifts the transmission to a Park range when the primary state is unable to shift the range.

24 Claims, 4 Drawing Sheets

RANGE SHIFTING OF AN AUTOMATIC TRANSMISSION

BACKGROUND OF THE INVENTION

1. Field of the Invention

This invention relates generally to electrical selection of a desired transmission operating range or mode, and more particularly to a shift-by-wire system for placing and maintaining an automatic transmission in a desired operating range or mode.

2. Description of the Prior Art

A shift-by-wire system for manually controlling an automatic transmission for a motor vehicle would free valuable space in the interior of the vehicle conventionally occupied by the mechanical floor shifter assembly and replace it with a shifter switch solution that controls the transmission electrically. Conventional floor shifters are typically mounted on the instrument panel or the floor pan. A shifter switch is much smaller than conventional shifter and can be packaged in multiple areas of the interior within the reach of the driver.

A shift-by-wire system would provide further opportunities like "Auto Park" type features by electrically activating a shift-by-wire switch and controlling the transmission without need for mechanical activation of the shift lever as in a conventional system. A shift-by-wire system can also enhance customer passive safety by automatically engaging Park if the driver exits the vehicle without placing the transmission in Park mode.

Use of a rotary actuator mounted directly to the transmission must be engineered specifically for each transmission and may not be feasible in the existing package environment. Use of electronic or hydraulic actuation to shift the transmission range requires significant re-engineering of the transmission controls and investment expense.

Although multiple techniques are available for controlling the transmission to enable shift-by-wire selection of the transmission mode, a need exists in the industry for a system that provides electronic selection of the transmission range, that minimizes the degree to which existing transmission systems must be modified, and is applicable to a range of automatic transmissions, i.e., independent of the transmission type. The system should meet or exceed the safety requirements of current manual shifters and conventional shift-by-wire systems.

SUMMARY OF THE INVENTION

A system for shifting a transmission range includes a selector producing a signal representing a selected range, and the system has a primary state wherein a source of electric power shifts the transmission to the selected range in response to the signal, and a secondary state wherein a source of mechanical energy shifts the transmission to a Park range when the primary state is unable to shift the range.

The system can be located in a convenient location remote from the transmission, thereby permitting the system to be used with a wide range of new and existing automatic transmissions without transmission redesign and associated capital expense and complexity.

The system can automatically engage the Park range, if the driver exits the vehicle without selecting Park and utilize seat and door switch sensors to detect the exit.

The system can use the Transmission Range Sensor (TRS) to verify correct operation of the primary and secondary mechanism as it relates to customer intent.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
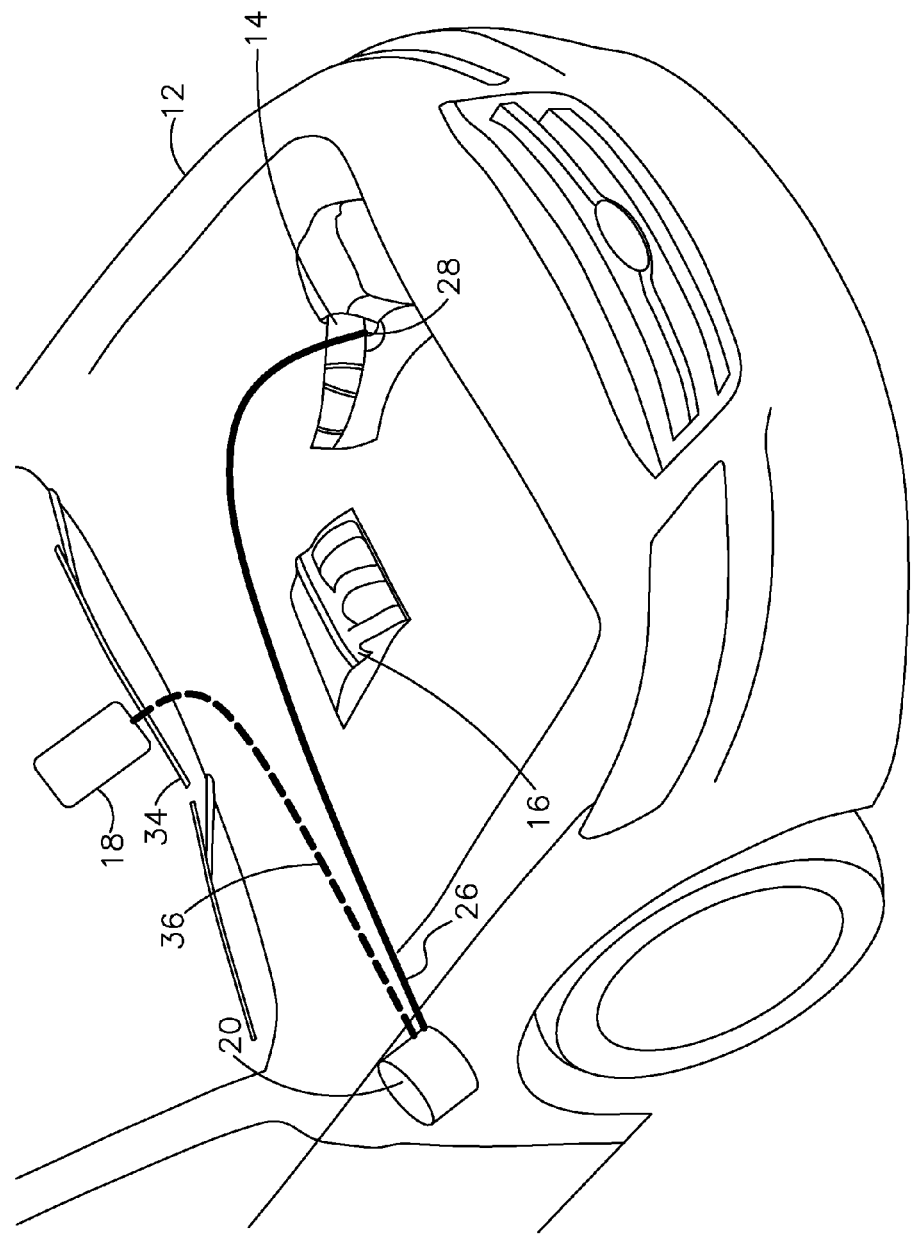
FIG. 1 is a perspective view showing components of a shift-by-wire system installed in a motor vehicle.
Figure 2:
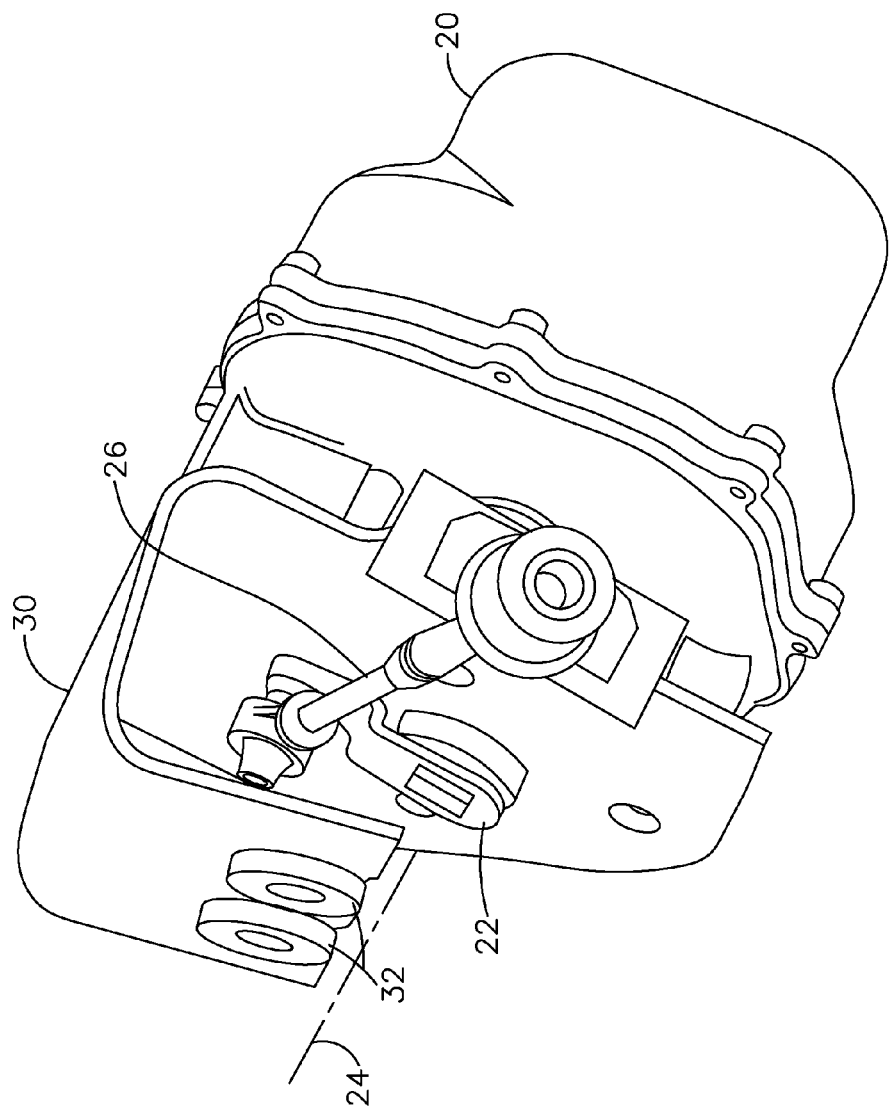
FIG. 2 is perspective view showing the actuator supported on a mounting bracket and a portion of the shift cable.

Referring now to the drawings, FIGS. 1 and 2 show the components of a shift-by-wire system 10 installed in preferable locations in a motor vehicle 12. The vehicle operator selects a desired transmission operating range among the conventional ranges, which may include, without limitation, P, R, N, D and L, corresponding respectively to Park. Reverse, Neutral, Drive and Low operating ranges. The system causes a multiple-speed automatic transmission 14 to shift to the selected operating range. The vehicle's powertrain includes a power source 16, such as an internal combustion engine, driveably connected to the transmission 14.

The system 10 includes an actuator assembly 20 secured by a mounting bracket 30 and rubber grommets 32 at any convenient place in the vehicle, such as in the underhood engine compartment, the interior of the vehicle, on the transmission 14 itself, or on the vehicle's chassis.

Longitudinal displacement produced by rotary movement of the actuator assembly's output lever 22 about axis 24 is transmitted along a shift cable 26 to a manual valve 28 of the transmission's hydraulic control system to the position that corresponds to the selected transmission operating range. The position of manual valve 28 connects a pressurized portion of the transmission's hydraulic system to a circuit that produces the selected operating range.

The preferred driver interface of the system 10 is a shifter switch 18, located in the passenger compartment on or near the vehicle's instrument panel. Shifter switch 18 produces a signal representing the selected transmission operating range, and the shift cable 26 moves the transmission's manual valve 28 in response to the signal produced as output by shifter switch 18.

Actuator assembly 20 may include a linear activated solenoid or a rotary actuator that causes output lever 22 to pivot about axis 24. Lever 22 can be eliminated such that the actuator directly attaches to the shift cable 26, or lever 22 can provide a mechanical advantage enabling use of a small, low-cost actuator. If lever 22 is used, it can also provide a manual override function, if desired.

Figure 3:
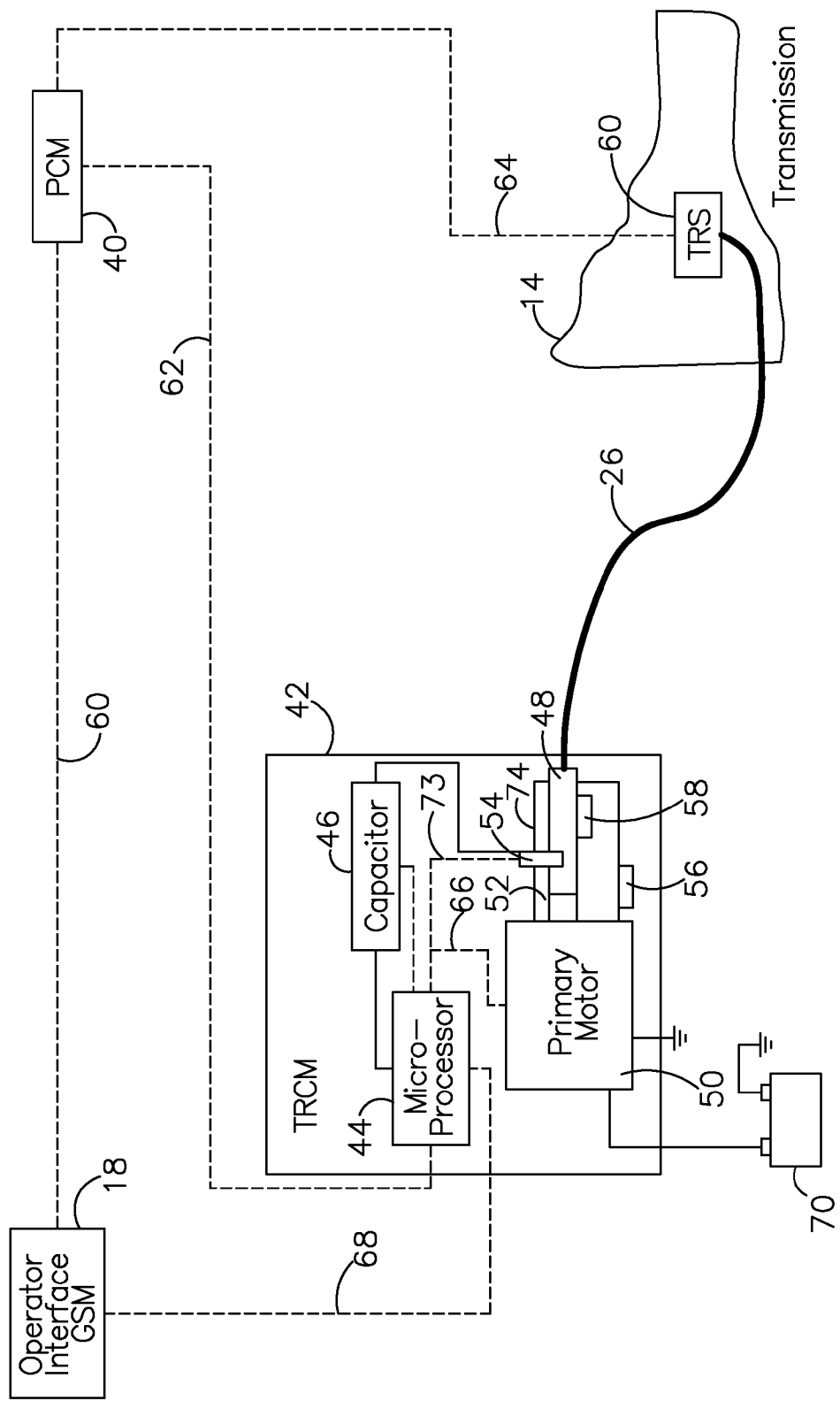
FIG. 3 is schematic diagram of the system of FIG. 1.

FIG. 3 illustrates in greater detail the arrangement of the components of the system 10, which includes the shifter switch 18; a powertrain control module (PCM) 40; and a transmission range control module (TRCM) 42, which incorporates primary and secondary actuators of the actuator assembly 20; microprocessor 44; capacitor 46; inner member 48; outer member 74; primary actuator motor 50; spring 52; secondary actuator release motor 54, primary output sensor 56; and secondary output sensor 58. The transmission 14 includes a transmission range sensor (TRS) 60, and the actuator 20 includes an on-board sensor 56 that is the functional equivalent to the TRS, which provides feedback on line 64 as a check on the current transmission operating range compared to the driver-selected range and TRCM 42 position. The inner and outer members 48, 74 are illustrated in the form of hollow cylinders, each having an open axial end.

Sensors 56, 58 are Hall-type position sensors, which produce signals representing the presence and absence of the sensed component at a reference position. Sensor 56 is a position sensor on the outer member 74. A signal produced by sensor 56 and carried on line 66 is used by the microprocessor 44 to verify that the angular position of the output lever 22 about axis 24 is correct relative to the desired, selected transmission operating range produced in response to the operator's manual control of the selector switch 18. A signal produced by sensor 58 and carried on line 66 is used by microprocessor 44 to verify that secondary output mechanism is functioning correctly.

Electronic signals produced by selector switch 18 are carried on line 60 to the PCM 40. Electronic signals produced by the PCM are carried on line 62 to the microprocessor 44 of the TRCM 42.

The actuator assembly 20 incorporated in the TRCM 42 includes a primary actuator state 71 and a secondary actuator state 72, both states being able to provide discrete positional control of lever 22 and shift cable 26.

During normal operation without a system failure, the secondary release motor 54 allows piston 48 to latch to the primary motor 50, thereby allowing piston 48 to move leftward and rightward among each transmission range in response to the signal produced by the selector switch 18.

Figure 4:
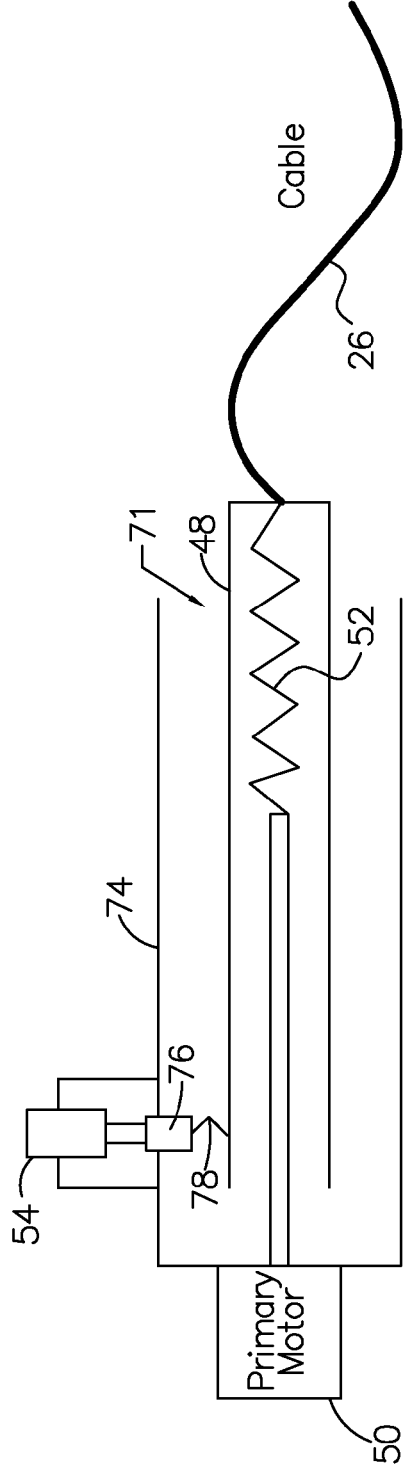
FIG. 4 is a schematic diagram illustrating the actuator functioning in a the primary state.

FIG. 4 shows the actuator assembly 20 in the primary actuator state 71, wherein, under normal operating conditions, the primary motor 50 moves the piston or inner sleeve 48, outer sleeve 74, spring 52, shifter cable 26 and transmission manual valve 28 to the selected transmission range position. In the primary actuator state 71, the secondary release motor 54, which is preferably a solenoid secured to outer sleeve 74, is retracted, thereby causing a detent bullet 76, secured to the inner sleeve 48 through a detent spring 78, to engage the outer sleeve due to the force of the detent spring 78. In the primary actuator state 71, motor 50 is energized with electric power from an electric power source such as an electric storage battery 70. In the primary actuator state 71, the inner and outer sleeves 48, 74 are moved as a unit by primary motor 50 to the position that causes the transmission 14 to shift to the selected operating range. The actuator assembly is in the primary actuator state 71 when the primary motor 50 is operative, i.e., electric power is supplied to the motor 50, microprocessor 44 permits motor 50 to operate, and the communication network is operative.

A secondary actuator state 72 returns the transmission 14 to the Park range during a failure mode condition that occurs due to loss of electrical power in the vehicle 12, loss of electronic communication among the components of the system 10 in the vehicle 12, or loss of the primary actuator function. The secondary actuator uses energy stored in spring 52 to force the piston 48 rightward in the direction where the transmission enters the Park range or position.

Figure 5:
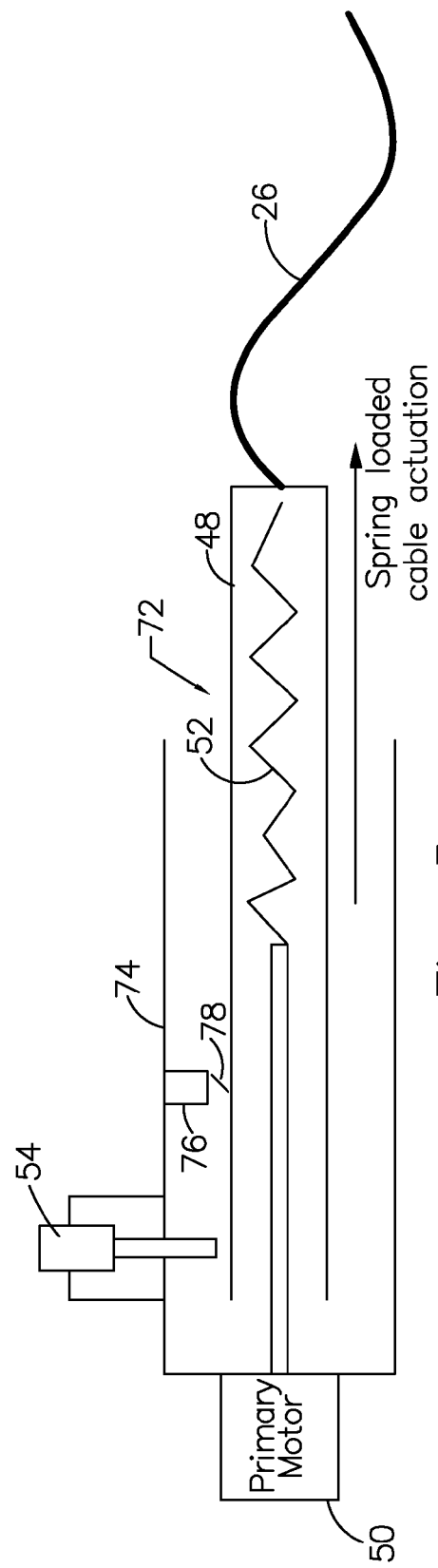
FIG. 5 is a schematic diagram illustrating the actuator functioning in the secondary state.

FIG. 5 shows the actuator assembly 20 in the secondary actuator state 72, wherein, under a failure condition the primary motor 50 is unable to move the transmission manual valve 28 to the selected transmission range position. In the secondary actuator state 72, electric energy from capacitor 46 activates solenoid 54, causing it to extend and to disengage the detent bullet 76 and detent spring 78 from the outer sleeve 74. This action allows spring 52 to expand within the inner sleeve 48, thereby moving the piston or inner sleeve 48, shifter cable 26 and transmission manual valve 28 to the position corresponding to the Park range position.

When the cause of failure mode operation is removed, the actuator assembly 20 will default to the Park position, the outer sleeve 74 moves to the position shown in FIG. 4, solenoid 54 retracts, detent bullet 76 reengages the outer sleeve 74 and normal operation resumes.

Capacitor 46 provides a backup power source for microprocessor 44 and the secondary release motor or solenoid 54, whereby power is available in the secondary state in the event of a power loss to the actuator assembly 20 or loss of communication in the system 10, as might occur when a wire harness becomes disconnected from actuator 20.

The transmission range sensor 60 within transmission 14 produces a signal carried on line 64 to the PCM 40. Microprocessor 44 uses the TRS signal to verify that the current transmission operating range is correct by comparing the actuator position signal carried on line 66 from sensor 56 to microprocessor 44 and the desired transmission range signal produced by selector switch 18 in response to the range selected by the vehicle operator carried on lines 60, 62 to the microprocessor.

The system 10 includes two-directional CAN communication with the TRCM 42. During a failure mode that includes loss of the CAN, a backup hardwire input to microprocessor on line 68 communicates the output signal from selector switch 18 to the microprocessor 44 of the TRCM 42. Microprocessor 44, powered by the backup capacitor 46 or a battery 70, controls operation of the secondary release motor 54 through line 73. Battery 70 or capacitor 46 provides actuating power to the secondary release motor 54.

The state of the electric field of capacitor 46 is continually monitored through microprocessor 44 to determine whether the secondary actuation mechanism has sufficient energy to perform properly in the event of a system failure. The microprocessor produces a sensible warning signal if the capacitor is under strength in relation to a reference field strength.

In accordance with the provisions of the patent statutes, the preferred embodiment has been described. However, it should be noted that the alternate embodiments can be practiced otherwise than as specifically illustrated and described.

The invention claimed is:

1. A system for shifting a transmission range, comprising:
a selector producing a signal representing a selected range;
a source of electric energy that linearly displaces a first actuator to the selected range in response to the signal, and a second actuator that releases a source of mechanical energy for linear displacement to a Park range and;
first and second sensors producing signals representing a position of the first and second actuators, respectively.

2. The system of claim 1, wherein the source of electric energy is an electric motor.

3. The system of claim 1, wherein the source of mechanical energy is a preloaded spring that stores one of a compression force and a torsion force.

4. The system of claim 1, further comprising:
first and second motors;

the first actuator is a first sleeve connected to the first motor to produce the selected range;

the second actuator is a second sleeve alternately engaged with and disengaged from the first sleeve by the second motor.

5. The system of claim 4, further comprising:
a microprocessor communicating with the first and second motors and the first and second sensors.

6. The system of claim 1, further comprising:
first and second motors;
the first actuator is a first sleeve actuated by the first motor
the second actuator is a second sleeve alternately engaged with and disengaged from the first motor by the second motor;
a manual valve of the transmission; and
a shift cable for transmitting movement of the second sleeve to the manual valve.

7. The system of claim 1, further comprising:
a first motor connected to the source of electric energy;
a secondary source of electric energy;
a second motor actuated by the secondary source of electric energy.

8. The system of claim 7, wherein the secondary source of electric energy is a capacitor charged with an electric field.

9. The system of claim 1, wherein the first and second actuators are mounted in a vehicle at a location that is remote from the transmission.

10. The system of claim 1, further comprising:
a transmission range sensor that produces a signal representing a current operating range of the transmission.

11. A system for shifting a transmission range, comprising:
a selector producing a signal representing a selected range;
a motor;
a source of mechanical energy;
an actuator having a primary state enabled by the motor to shift the transmission to the selected range in response to the signal, and a secondary state enabled by the mechanical energy source to shift the transmission to a Park range when the primary state is unable to shift the range; and
first and second sensors producing signals representing a position of first and second sleeves, respectively, of the actuator.

12. The system of claim 11, wherein the source of mechanical energy is a preloaded spring that stores one of a compression force and a torsion force.

13. The system of claim 11, further comprising:
a solenoid having latched and unlatched states;
a spring connected to the motor and that stores and releases the mechanical energy;
a detent that alternately maintains mechanical energy in the spring when the solenoid is latched and releases mechanical energy from the spring when the solenoid is unlatched.

14. The system of claim 11, further comprising:
a solenoid having latched and unlatched states;
a spring connected to the motor and that stores and releases the mechanical energy;
a detent that alternately maintains mechanical energy in the spring when the solenoid is latched and releases mechanical energy from the spring when the solenoid is unlatched;

a manual valve of the transmission; and
a shift cable for transmitting movement of the spring to the manual valve.

15. The system of claim 11, further comprising:
a solenoid having latched and unlatched states;
a spring connected to the motor and that stores and releases the mechanical energy; and
a microprocessor communicating with the motor and the solenoid, and the first and second sensors.

16. The system of claim 11, further comprising:
a solenoid having latched and unlatched states;
a source of electric energy electrically connected to the motor; and
a secondary source of electric energy electrically connected to the solenoid for unlatching the solenoid and releasing the mechanical energy in the secondary state.

17. The system of claim 16, wherein the secondary source of electric energy is a capacitor charged with an electric field.

18. A system for shifting a transmission range, comprising:
a selector producing a signal representing a selected range;
a motor;
a first sleeve releasably connected to the motor and containing a spring
a second sleeve alternately engaged with and disengaged from the first sleeve by a solenoid;
an actuator having a primary state enabled by the motor to shift the transmission to the selected range in response to the signal, and a secondary state enabled by a mechanical energy source to shift the transmission to a Park range when the primary state is unable to shift the range; and
first and second sensors producing signals representing a position of the first and second sleeves, respectively.

19. The system of claim 18, wherein the source of mechanical energy is the spring that stores one of a compression force and a torsion force.

20. The system of claim 18, further comprising:
a detent that alternately maintains mechanical energy in the spring when the solenoid is latched and releases mechanical energy from the spring when the solenoid is unlatched.

21. The system of claim 18, further comprising:
a detent that alternately maintains mechanical energy in the spring when the solenoid is latched and releases mechanical energy from the spring when the solenoid is unlatched;
a manual valve of the transmission; and
a shift cable for transmitting movement of the first sleeve to the manual valve.

22. The system of claim 18, further comprising:
a microprocessor communicating with the motor, and the first and second sensors.

23. The system of claim 18, further comprising:
a source of electric energy electrically connected to the motor; and
a secondary source of electric energy electrically connected to the solenoid for unlatching the solenoid and releasing the mechanical energy in the secondary state.

24. The system of claim 23, wherein the secondary source of electric energy is a charged capacitor.

* * * * *